Dec. 13, 1955  H. G. ANASTASIA ET AL  2,726,544
RATE OF CHANGE INDICATOR
Filed Aug. 15, 1952  4 Sheets-Sheet 1
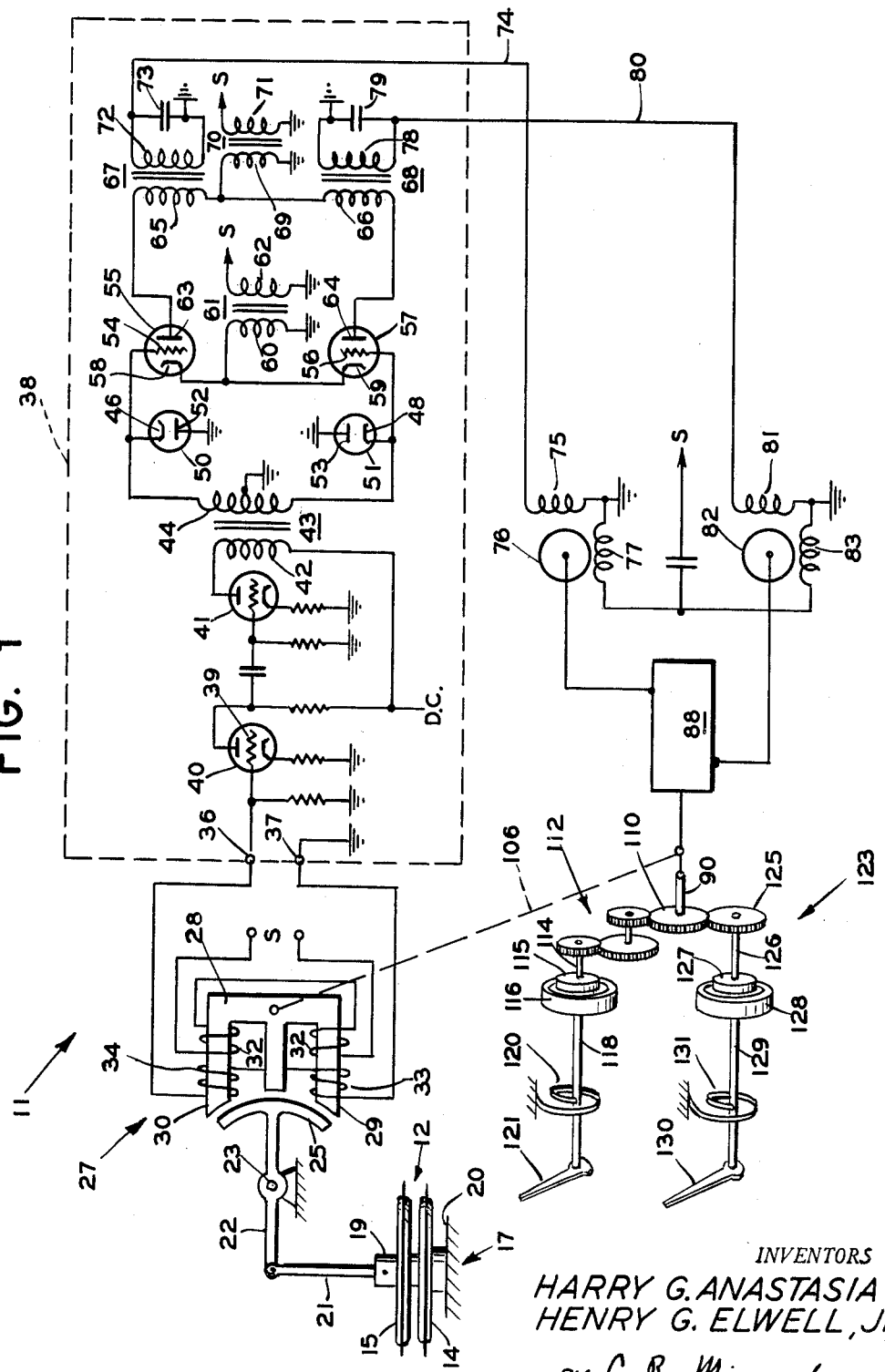
INVENTORS
HARRY G. ANASTASIA
HENRY G. ELWELL, JR.
BY C. R. Miranda
ATTORNEY

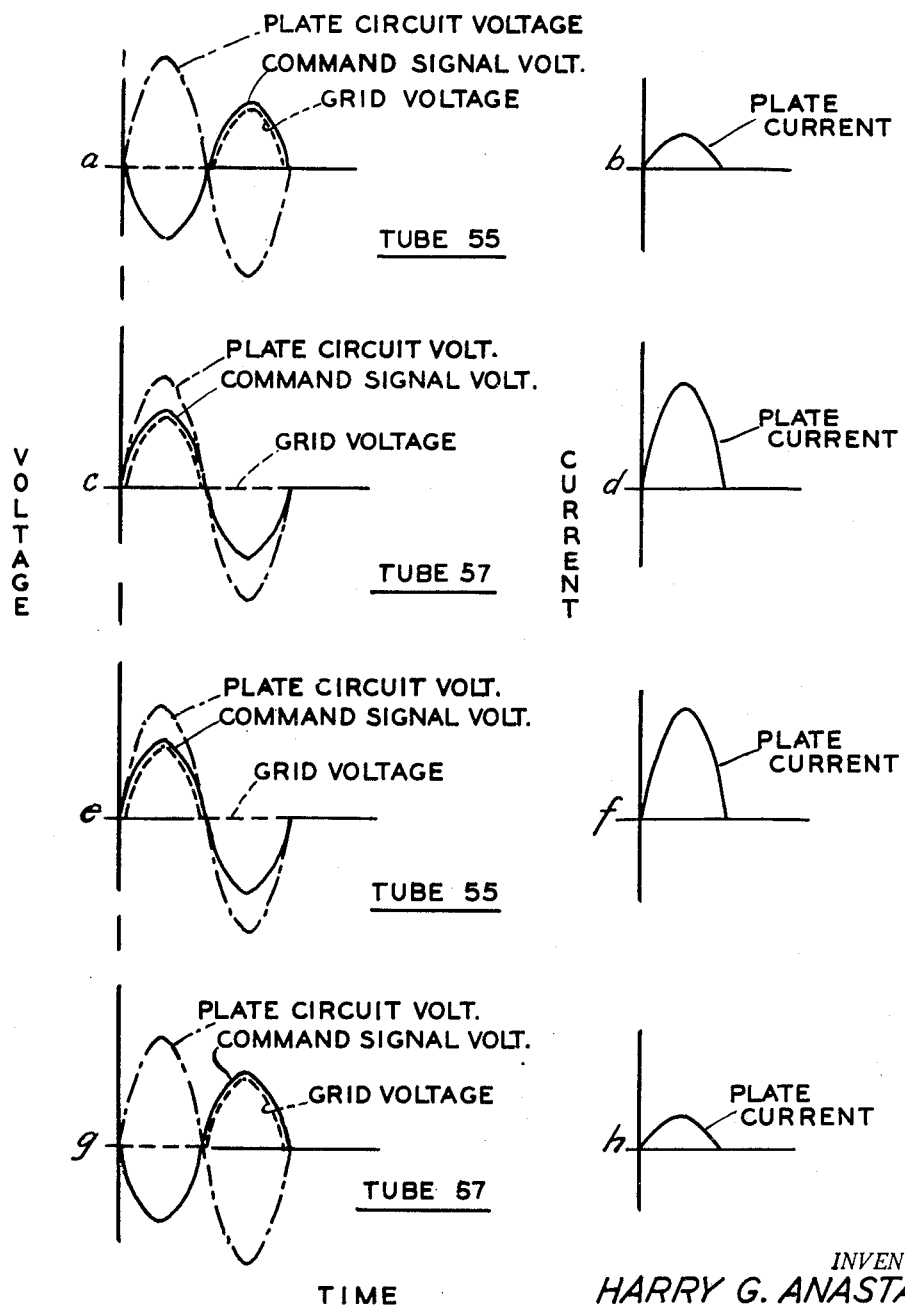

Dec. 13, 1955     H. G. ANASTASIA ET AL     2,726,544
RATE OF CHANGE INDICATOR

Filed Aug. 15, 1952     4 Sheets-Sheet 3

INVENTORS
HARRY G. ANASTASIA
HENRY G. ELWELL, JR.
BY C. R. Miranda
ATTORNEY

Dec. 13, 1955　　H. G. ANASTASIA ET AL　　2,726,544
RATE OF CHANGE INDICATOR

Filed Aug. 15, 1952　　4 Sheets-Sheet 4

INVENTORS
HARRY G. ANASTASIA
HENRY G. ELWELL, JR.

BY C. R. Miranda
ATTORNEY

United States Patent Office 2,726,544
Patented Dec. 13, 1955

2,726,544

RATE OF CHANGE INDICATOR

Harry G. Anastasia, Paramus, and Henry G. Elwell, Jr., Hackensack, N. J., assignors to Bendix Aviation Corporation, Teterboro, N. J., a corporation of Delaware Application August 15, 1952, Serial No. 304,514

14 Claims. (Cl. 73—179)

This invention in general relates to indicating instruments and more particularly to instruments for indicating rate of change of pressure.

Indicating instruments of this type as used heretofore, generally utilize an evacuated pressure responsive member which actuates a signal generator in response to changing ambient atmospheric pressures. The signal from the generator controls a motor connected through a drive mechanism to an indicator for indicating the rate of change in pressure. This arrangement is unsatisfactory because the instrument operates erratically for small rates of change in pressure due to inherent friction in the drive mechanism and the small motor torques at the correspondingly low motor speeds. Where the rate of change in pressure indicator is used as a rate of climb or descent indicator for aircraft, it is difficult for the pilot to detect small rates of change in altitude.

An object of the present invention is to provide a novel rate of change in pressure indicator which operates to effect accurate indications of small changes in pressure rates.

A further object is to provide a rate of change in pressure indicator which operates accurately over a wide range of changes in pressure rates.

A still further object is to provide a novel rate of change in pressure indicator wherein a pair of constantly operating motors are provided to differentially drive an indicator.

Still another object is to provide a novel rate of change in pressure indicator wherein a signal generator, responsive to rate of change in pressure, develops signals which vary a predetermined speed relationship between a pair of constantly running motors to effect indications of rates of change in pressures.

The present invention contemplates a novel rate of change in pressure indicator for accurately indicating rates of change in pressures throughout a wide range, and especially, small rates of change in pressures. The indicator comprises a signal generator which is actuated by a pressure responsive member to develop a command signal. A pair of constantly running motors operate at predetermined relative speeds and means are provided for altering the speed relationship in accordance with the command signal. The motors differentially drive a pair of indicators relative to a dial having rate of change in pressure or altitude designations thereon, through a differential gearing arrangement to provide low rate indications over one range of pressure rate changes, for example, from zero to 5,000 feet per minute and high rate indications over a substantially larger range of pressure rate changes, for example, from zero to 35,000 feet per minute.

The above and other objects and advantages of the present invention will appear more fully hereinafter from a consideration of the detailed description which follows taken together with the accompanying drawings wherein one embodiment of the invention is illustrated.

In the drawings:

Fig. 1 is a schematic illustration of the rate of change in pressure indicator embodying the present invention;

Fig. 2 is a graphical and diagrammatic representation to aid in understanding the invention.

Figure 4:
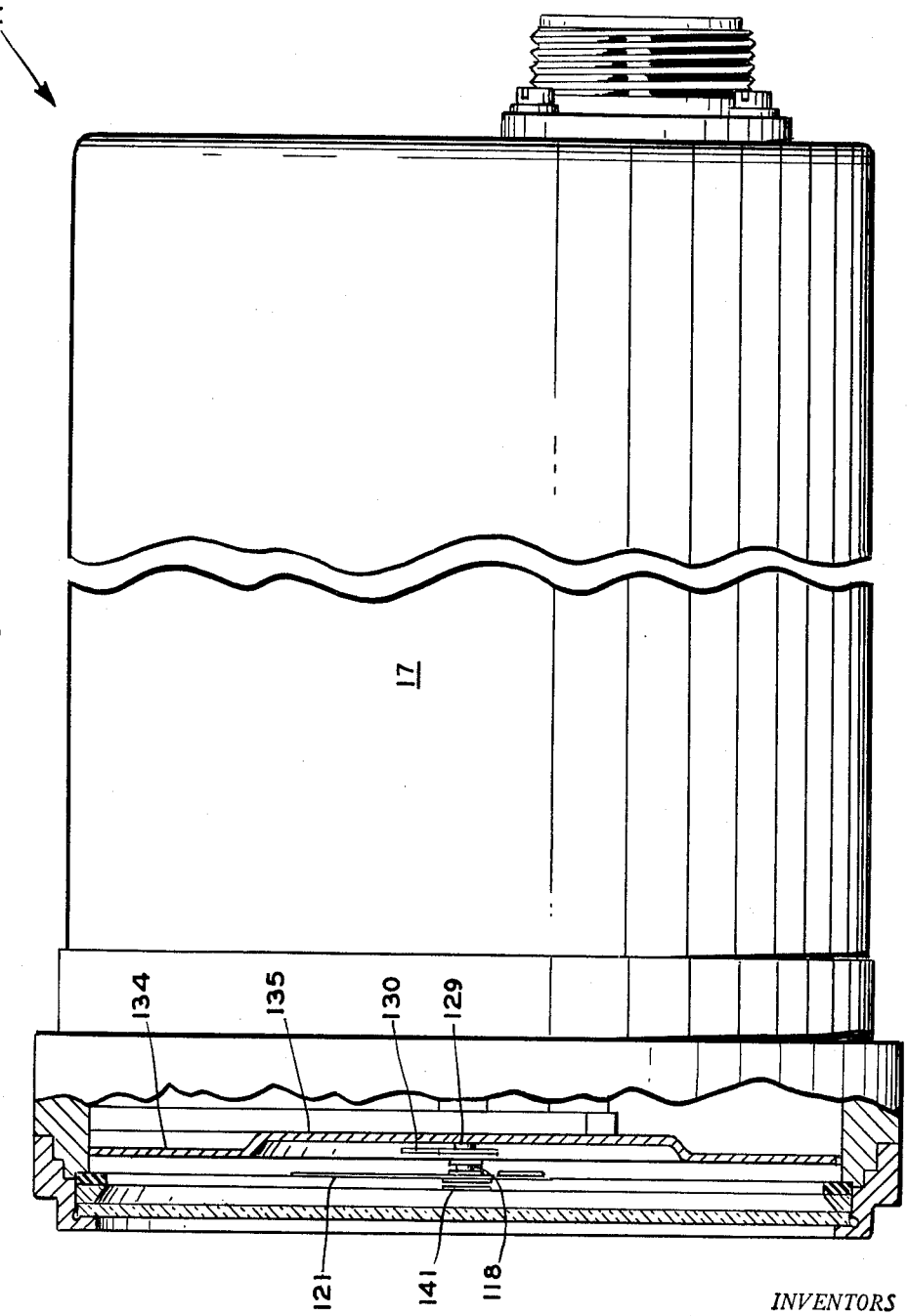
Fig. 4 is in part a side view and in part a vertical section of the indicator of Fig. 1.

Referring now to the drawings for a more detailed description of the present invention, and more particularly to Fig. 1 wherein one embodiment thereof is clearly illustrated schematically, a rate of change of pressure indicator, generally designated by the numeral 11, is adapted for use with aircraft and is shown as comprising a pressure responsive member or aneroid 12 consisting of a pair of sealed and evacuated capsules 14 and 15. Aneroid 12 is mounted within a sealed instrument casing 17, shown in Fig. 4, and is subjected to the air pressure of the altitude at which the craft operates by means of a tube (not shown) which connects the interior of the casing to the static chamber of a Pitot tube (not shown) open to the atmosphere.

Lower capsule 14 is secured to an inner wall 20 of the casing while upper capsule 15 has secured thereto a post 19 with a link 21 pivoted thereto at one of its ends. Variations in atmospheric pressure causes aneroid 12 to expand and contract to effect movement of post 19. The other end of link 21 is connected to one end of a lever 22 which oscillates about a pivot 23. Lever 22 comprises an arcuate shaped vane or armature 25 made of magnetic material, such as soft iron, for example.

Armature 25 is part of a pick-off or signal generator, such as a variable inductive device 27, which comprises a three-legged transformer 28 having outside arms 29 and 30. Arms 29 and 30 carry primary windings 32 connected in series aiding relation to a suitable source of alternating current S and a pair of secondary windings 33 and 34, the latter being connected in series opposition. When iron armature 25 is centered with respect to arms 29 and 30 and windings 32 are energized, there is the same amount of flux in arms 29 and 30 so that the voltages induced in opposed windings 33 and 34 balance to effect zero output. If armature 25 is off-center, more flux appears in one arm of the transformer than in the other arm so that the voltages induced in opposed windings 33 and 34 are unequal and a resultant voltage appears across the series combination of the secondary windings. The phase of the voltage is determined by the direction of movement of armature 25.

The output from the pick-off device is applied to the input terminals 36 and 37 of an amplifier 38, and is fed to the control grid 39 of a first amplifier tube 40. The output of tube 40 is further amplified by a second tube 41 from whence it is fed to the primary winding 42 of an interstage transformer 43 having a secondary winding 44. Transformer winding 44 is connected at its midpoint to ground while the opposite ends of the winding are connected to the cathodes 46 and 48 of a pair of diodes 50 and 51, respectively, the plates 52 and 53 of the diodes being connected to ground.

Cathode 46 of diode 50 is connected in circuit with the control grid 54 of a phase discriminator triode 55 while cathode 48 of diode 51 is connected to the control grid 56 of a phase discriminator triode 57. Tubes 55 and 57 have cathodes 58 and 59, respectively, connected together to the secondary winding 60 of a step-down transformer 61 which has a primary winding 62 connected to alternating current source S. Plates 63 and 64 of tubes 55 and 57, respectively, are connected through the primary windings 65 and 66 of a pair of impedance step-down transformers 67 and 68, respectively, to the secondary winding 69 of a step-up transformer 70 having its primary winding 71 connected to alternating current source S.

Transformer 67 has a secondary winding 72 and a resonating condenser 73 connected in parallel therewith, and the output of the transformer is connected by way of a conductor 74 to the variable phase winding 75 of a two-phase alternating current motor 76 having a fixed phase winding 77 connected to alternating current source S. Transformer 68 has a secondary winding 78 and a resonating condenser 79 connected in parallel therewith, and the output of the transformer is connected by way of a conductor 80 to the variable phase winding 81 of a two-phase alternating current motor 82 having a fixed phase winding 83 energized from alternating current source S.

Considering now the operation of the arrangement thus far described, let it be assumed that the craft is in straight and level flight and that armature 25 is centered and as a result, no resultant or command signal output from pick-off 27 is effected. Discriminator tubes 55 and 57 under this condition will operate motors 76 and 82 at equal speeds. This is accomplished in the following manner: Tubes 55 and 57 are each provided with a plate voltage which is in phase with the cathode to ground voltage; that is, when the plate goes positive, the cathode goes positive and when the plate goes negative, the cathode also goes negative. The grids of tubes 55 and 57 in the absence of a command signal are at ground potential and by making the cathode voltage low enough, the tubes will conduct every alternate half cycle, that is, when the plates go positive. Thus, the voltage across the grid-cathode of each discriminator tube is maintained at a sufficient value above cut-off to permit the tubes to conduct in the absence of a command signal. It will be appreciated that with no command signal, diodes 50 and 51 will not conduct because grids 54 and 56 are at ground potential.

The output of each tube is fed to transformers 67 and 68, respectively, where the resonating condensers 73 and 79 change the half-cycle or pulsating D. C. type output to full-wave sinusoidal voltages. The alternating current output from each transformer is then fed to the respective variable phase windings to operate the respective motors at predetermined speeds and preferably the same speed.

Let it now be assumed that the static pressure effecting aneroid 12 decreases thereby indicating the craft is climbing. As a result, capsules 14 and 15 expand to actuate levers 21 and 22 to angularly displace armature 25 in a clockwise direction. A command signal will therefore be effected from pick-off 27 which is amplified by tube 40 and 41 and fed to interstage transformer 43. The command signal at the input of amplifier 38 may be considered as going from positive in the first half cycle, to negative in the second half cycle and the signal, hereinafter referred to as the upper command signal, across the upper half of secondary winding 44 will be reversed 180 degrees or of opposite phase with respect to the command signal, that is, going from a negative polarity in the first half cycle to a positive polarity in the second half cycle. The signal, hereinafter referred to as the lower command signal, across the lower half of winding 44 will be in phase with respect to the command signal or going from a positive polarity in the first half cycle to a negative polarity in the second half cycle.

The operation of discriminator tubes 55 and 57 under the foregoing condition will be more readily appreciated by considering the curves shown in Figures 2a, 2b, 2c and 2d. Figure 2a shows in full line the curve of the upper command signal voltage appearing across the upper half of winding 44, the grid voltage curve in a broken line for tube 55, and the plate circuit voltage curve for tube 55 in dot-dash line. It will be noted that the grid voltage in Figure 2a is zero when the plate is going positive during the first half cycle because the negative half of the upper command signal will make cathode 46 of diode 50 negative with respect to plate 52 to effect conduction of the diode thereby connecting the grid directly to ground. Tube 55 will conduct at this time during the first half cycle and the output or plate current thereof is shown on Fig. 2b. When the upper command signal is going positive during the second half cycle, this positive voltage is impressed on grid 54 but the plate is going negative so that there will be no plate current for this second half cycle. From the foregoing, it is seen that tube 55 is maintained at a predetermined level of conduction and conducts every alternate half cycle to operate motor 76 at the predetermined speed.

Figure 2c discloses the curve for the lower command signal voltage appearing across the lower half of winding 44 and the grid and plate circuit voltage curves for tube 57. During the first half cycle of the lower command signal, grid 56 has the positive half of the signal impressed thereon and since plate 64 is also going positive, the output of triode 57 is increased an amount proportional to the magnitude of the command signal to increase the level of conduction of the triode to operate motor 82 at a greater speed than that of motor 76. The output of triode 57 may be seen in Figure 2d. During the next half cycle or negative half of the lower command signal, triode 57 will not conduct since plate 64 is going negative.

When the static pressure affecting aneroid 12 increases to indicate that the craft is losing altitude or descending, capsules 14 and 15 contract to rotate armature 25 in a counter-clockwise direction. The command signal from pick-off 27 is now of opposite phase so that the upper command signal voltage across the upper half of winding 44 is going from a positive polarity in the first half cycle to a negative polarity in the second half cycle while the lower command signal voltage across the lower half of the winding is going from a negative polarity in the first half cycle to a positive polarity in the second half cycle.

Figures 2e, 2f, 2g and 2h disclose the operation of tubes 55 and 57 when the craft descends. Figure 2e discloses the curve of the upper command signal voltage across the upper half of winding 44 in full line and the grid voltage and plate circuit voltage curves for tube 55. It will be noted that in the first half cycle of the upper command signal diode 50 will not conduct and the grid voltage and the plate voltage are in phase so that the tube will be rendered more conductive to effect a greater plate current thereby increasing motor 76 above the predetermined speed. The output from tube 55 may be seen in Figure 2f. During the second half cycle of the upper command signal, diode 50 will conduct but plate 63 of tube 55 is going negative so that the tube will not conduct.

Figure 2g discloses the operation of tube 57 during this time. It may be seen that when the lower command signal across the lower half of winding 44 is going negative, diode 51 will conduct to connect grid 56 directly to ground. Since plate 64 is going positive, tube 57 will conduct to supply variable phase winding 81 with sufficient current to operate motor 82 at the predetermined speed. When the signal goes positive, plate 64 is going negative so that tube 57 will not conduct. The plate current curve output of tube 57 may be seen in Figure 2h.

In view of the foregoing, it is now apparent that with zero command signal, both motors 76 and 82 operate at a predetermined speed and in the same direction. When the craft begins to climb, a command signal of one phase is effected and motor 82 increases its speed while motor 76 is maintained at the predetermined speed, whereas when the craft descends, a command signal of opposite phase is effected and motor 76 increases its speed while motor 82 is maintained at the predetermined speed.

It will be apparent that diodes 50 and 51 serve to prevent slowing or stoppage of motors 76 and 82 when the voltage applied to grids 54 and 56 goes negative and is of a negative phase in the sense that it is opposite to the phase of the plate circuit voltage. If diodes 50 and 51 were eliminated, when a voltage of negative phase is applied to grids 54 and 56, plate current flow in discriminator tubes 55 and 57 would be decreased to bring the motor speeds below the predetermined speed. In effect, diodes 50 and 51, when conducting, cause a short circuit from grid to ground to nullify the effect of the command signal, and conversely, when non-conducting, present an open circuit across the electrodes and have no effect on the command signal.

Motors 76 and 82 drive into a conventional differential gearing arrangement, illustrated in Figure 1 as a box 88, having an output shaft 90. Differential gearing arrangement 88 is designed so that when both motors are operating at the predetermined speed, output shaft 90 remains stationary. When one of the motors attains a higher speed than the speed of the other motor in response to a change in altitude, then output shaft 90 rotates in one direction, and when the other motor attains a higher speed then the shaft rotates in the opposite direction.

Shaft 90 drives transformer 28 in a direction tending to effect correspondence with armature 25 through a follow-up driving connection, shown in Figure 1 as a broken line 106, in a manner well known to those skilled in the art.

An output gear 110 is connected for operation by shaft 90 and drives into a step-up gear train, generally designated by the numeral 112. Connected to the output of gear train 112 is a shaft 114 which has fastened thereto a disc-shaped magnet 115 positioned for rotation within a metallic cylinder or cup 116. Magnet 115 and cup 116 comprise an eddy drag coupling whereby rotation of magnet 115 induces eddy current in cup 116 to drive a shaft 118 connected to the cup. Rotation of shaft 118 is restrained by a helical hairspring 120 which provides for a calibrated displacement of a pointer 121 carried by the shaft.

Figure 3:
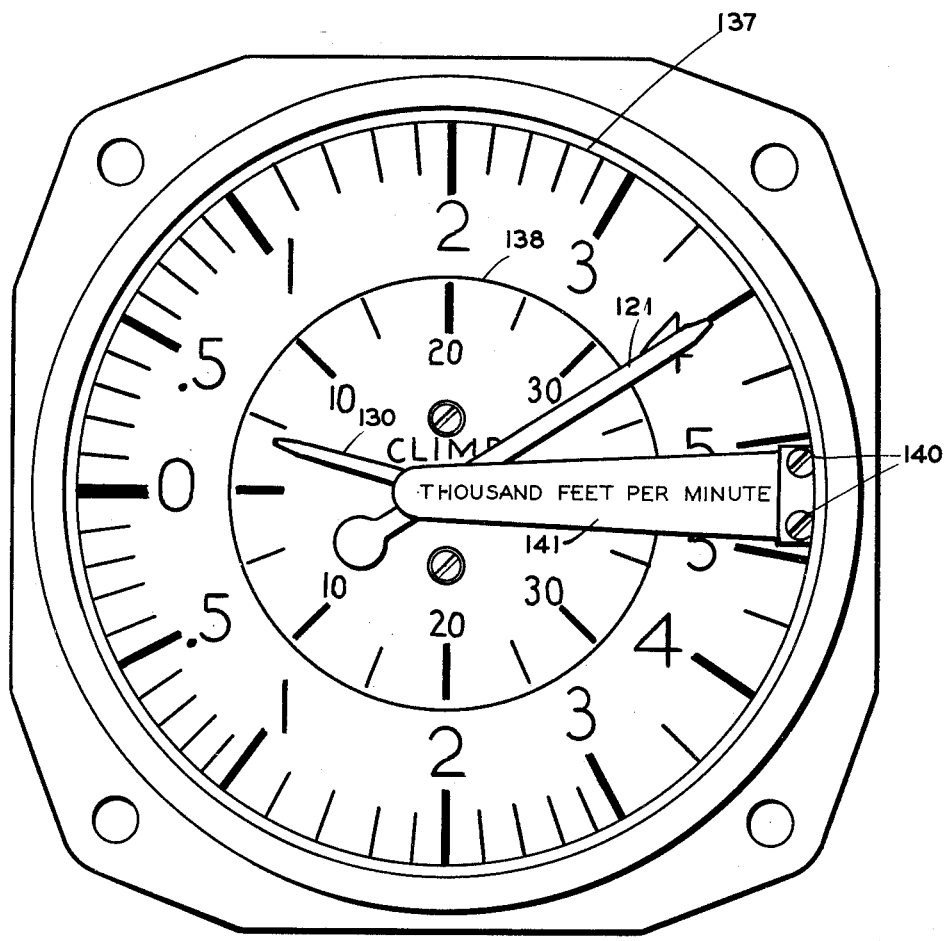
Fig. 3 is a front view of the indicator of Fig. 1.

Output gear 110 also drives a shaft 126 through a second step-up gear train generally designated by the numeral 123, and shown as comprising a gear 125 in mesh with gear 110. Secured to one end of shaft 126 is a disc magnet 127 which rotates within a metallic cylinder or cup 128, the last two mentioned elements forming a second eddy drag coupling. Connected to cup 128 is a shaft 129 which drives a pointer or indicator 130 against the bias of a helical hairspring 131. The ratio of gear train 112 to gear train 123 preferably is seven to one so that the displacement of pointer 121 is much greater than the displacement of pointer 130 for the same speed of operation of output shaft 90. The actual construction of the pointers are seen in Figures 3 and 4 wherein shaft 118 extends through hollow shaft 129 which is concentrically arranged relative to shaft 118.

Pointers 121 and 130 move relative to a dial member 134, Figure 4, having an offset or indented portion 135. Dial member 134 and portion 135 have concentrically arranged scales 137 and 138 which bear designations thereon, such as rate of climb in thousands of feet per minute, for example. Pointer 121 is read with respect to scale 137 to provide low rate indications of rate of climb of the craft, while pointer 130 is read with respect to scale 138 to provide higher rate of climb indications. The spacing of the indicia on scale 137 is non-linear to provide for more accurate readings of small changes in rate of climb or descent of the craft and this is effected through the use of a logarithmic linkage (not shown) which is clearly and fully described in copending application Serial No. 187,524 filed September 29, 1950, in the name of H. G. Anastasia. With the use of the logarithmic linkage (not shown), the movement of pointer 121 will be proportionately greater between zero and one, than between one and five, for equal linear increments in speed of output shaft 90. Secured to the face of dial 134 and spaced therefrom, as by screws 140 is a finger-shaped mask 141 which hides pointer 121 when it goes slightly beyond the five thousand feet per minute indication. Stop means (not shown) are provided for arresting motion of pointer 121 so as to prevent it from travelling past the mask.

From the foregoing structure, it is apparent that when the craft ascends, a signal of proper phase increases the speed of motor 82 to effect movement of pointers 121 and 130 in a clockwise direction while descent of the craft causes the speed of motor 76 to increase to effect movement of the pointers in a counterclockwise direction. Thus, a pilot, with the indicator of the present invention, may observe the rate of climb and descent of the craft through a low rate range and a higher rate range to accurately determine the above conditions.

The present invention provides a novel rate of change of pressure indicator for effectively indicating rate of change of pressure through a wide range and especially small rates of changes in pressure. By providing a pair of constantly operating motors, inherent friction in the mechanism which normally causes erratic operation of the instrument is overcome, whereby an efficient indicator is provided for low rates of pressure change.

Although one embodiment of the present invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. In a rate of change of altitude indicator, a member responsive to changes in atmospheric pressures, a dial bearing rate of change of altitude designations thereon and arranged to provide low and high rate of change of altitude scales, a separate indicator associated with each scale, a pair of motors operating at predetermined relative speeds when the altitude is constant, means responsive to said pressure responsive member for altering the relative speeds of said motors in accordance with the rate of change in altitude, an output member movable in response to a change in the relative speeds of said motors, and means drivably controlled by said output member to provide relative movement between said scales and said indicators to effect more sensitive indications of rate of change in altitude through low rates of altitude change than through high rates of altitude change.

2. In a rate of change of altitude indicator, a pressure member responsive to changes in altitude, signal generating means controlled by said member for developing a command signal corresponding to the rate of change in altitude and whose phase corresponds to the direction of change in altitude, an electronic amplifier having an input and an output with its input connected to receive the command signal, a pair of motors connected to said amplifier output and operating at predetermined relative speeds when the altitude is constant, means in said amplifier responsive to the phase of the command signal for varying the speed of one of said motors while maintaining the speed of the other motor constant when the command signal is of one phase and for varying the speed of the other of said motors while maintaining the speed of said one motor constant when the command signal is of opposite phase, and an output member movable in response to the change in the speed relationship between said motors, the direction of movement of said output member being determined by the phase of the command signal.

3. In a rate of change of altitude indicator, a pressure member responsive to changes in altitude, signal generating means controlled by said member for developing a command signal whose phase corresponds to the direction of change in altitude, an electronic amplifier having an input and an output with its input connected to receive the command signal, a pair of motors connected to the amplifier output, a pair of phase discriminator tubes in said amplifier having control grids biased to maintain a predetermined level of conduction to effect continuous operation of said motors at equal speeds when altitude is not changing, means for coupling a signal representative of the command signal to the control grids of said tubes for increasing the conductivity of one or the other of said tubes depending upon the phase of the command signal to effect operation of one motor at a speed greater than the speed of the other motor, and an output member movable in response to the change in relative speeds of said motors, the direction of movement of said output member being governed by the motor operating at the higher speed.

4. An electronic amplifier comprising an input connected to receive a signal of variable phase, a pair of electron discharge tubes having control grids, means for biasing said control grids to maintain the tubes at a predetermined level of conduction, means connecting said signal to said control grids to raise the conduction level of said tubes above the predetermined level, and a diode associated with each tube for disconnecting the signal from one or the other of said control grids depending upon the phase of said signal to maintain the tube having its grid disconnected at the predetermined level of conduction.

5. In apparatus for indicating the rate of change in a condition, signal generating means responsive to a change in said condition for developing a command signal corresponding in magnitude to the rate of change in said condition, a pair of continuously running motors operating at speeds bearing a predetermined relationship with respect to each other when said condition is not changing, means responsive to said command signal for changing the predetermined relationship in motor speeds, and an output member responsively coupled to said motors and movable an amount corresponding to the change in relation between the motor speeds and corresponding to the rate of change in said condition.

6. In apparatus for indicating the rate of change in ambient static pressure, signal generating means responsive to a change in ambient pressure for developing a command signal corresponding to the rate of change in said pressure, a pair of continuously running motors, means responsive to the command signal for operating one of said motors at a greater speed than the other motor, and an output member operatively connected to said motors and displaceable when a change in the relative speeds of said motors occurs, the amount of displacement of said member corresponding to the extent of change in relative motor speeds and the rate of change in ambient pressure.

7. In apparatus for indicating the rate of change of a condition, signal generating means responsive to a change in said condition for developing a command signal having a magnitude substantially proportional to the rate of change in said condition, a pair of motors each continuously rotating in one direction and operating at the same speed when said condition is not changing, means responsive to the command signal for operating one of said motors at a different speed than the other motor, a movable output member for indicating the rate of change in said condition, and means operatively coupling said motors differentially to said output member to provide movement of said output member when a change in relative motor speeds occurs.

8. Apparatus for indicating the rate of change in a condition, means operable in response to a change in said condition, a signal generating means for developing a variable control signal and having a first movable part movable in response to said first-mentioned means and having a second movable part, a pair of continuously running motors bearing a predetermined relationship to each other when said condition is not changing, means responsive to said control signal for changing the predetermined relationship in motor speeds, an output member responsively coupled to said motors and movable an amount corresponding to the change in relationship in motor speeds, a follow-up connection for coupling said output member to said second movable part so that said second part follows the movement of said first part to develop a magnitude for said control signal which corresponds to the rate of change in said condition, and means controlled by said output member for indicating the rate of change in said condition.

9. Apparatus for indicating the rate of change in a condition, means operable in response to a change in said condition, inductive signal generating means for developing a variable control signal, said generating means including a movable transformer having a primary winding adapted for energization and a pair of secondary windings connected in series opposition across a pair of output terminals and a movable magnetic member for varying the relative inductive coupling between said primary winding and each of said secondary windings, means for coupling said magnetic member to move responsively with said first-mentioned means, an amplifier having an input for receiving said control signal and two outputs, a pair of motors connected to a respective different one of said outputs and adapted to operate at the same speed when said condition is not changing, means in said amplifier responsive to the phase of said control signal for increasing the speed of one motor relative to the other motor depending upon the phase of said control signal, an output member responsively coupled to said motors and movable an amount corresponding to the relative motor speeds, a follow-up connection for coupling said output member to said movable transformer so that said transformer with its windings follows the movement of said magnetic member to develop a magnitude for said control signal which is substantially proportional to the rate of change of said condition, and means controlled by said output member for indicating the rate of change in said condition.

10. Phase-sensitive amplifying apparatus, comprising a pair of amplifying devices each having control means for controlling the conduction thereof, means for establishing a predetermined relative conduction for said devices, means for coupling a signal of variable phase to the control means of said devices to increase the conduction of one device relative to the other device depending upon the phase of said signal, and a pair of unidirectional electrically conductive devices each associated with a different one of said amplifying devices for clipping a portion of the signal coupled to the control means thereof depending upon the phase of the signal.

11. Phase-sensitive amplifying apparatus, comprising means adapted to have developed thereacross an input signal of variable phase, means for deriving from said input signal a first signal substantially in phase therewith and a second signal of substantially opposite phase, means for modifying said first and second signals by clipping said first and second signals during the negative half cycles thereof, a pair of amplifying devices each having control means for controlling the conduction thereof, means for establishing a predetermined relative conduction for said devices, and means for coupling said modified first signal to the control means of one amplifying device and said modified second signal to the control means of said other amplifying device to increase the conduction of one device relative to the other device depending upon the phase of said input signal.

12. A phase-discriminating amplifier, comprising a pair of electron discharge devices each having an anode, a cathode and a control electrode for controlling the anode-cathode conduction therein, means for supplying in phase to the anodes of said devices an A. C. voltage from an A. C. source, means for biasing the control electrode of each device to establish a predetermined level of conduction for each device, an input for the amplifier adapted to receive an A. C. signal voltage of substantially the same frequency as the source voltage and of a variable phase which is either substantially in phase with the source voltage or substantially opposite to the phase of the source voltage, means for deriving from said received voltage a first voltage having a magnitude corresponding to the magnitude of said received voltage and substantially in phase therewith and a second voltage having a magnitude corresponding to the magnitude of said received voltage and of substantially opposite phase, means for modifying said first and second voltages by suppressing the negative peaks thereof, said last-mentioned means including a pair of rectifying devices each connected in a separate circuit between the control electrode and cathode of a different one of said discharge devices, and means for applying said modified first voltage to the control electrode of one of said discharge devices and for applying said modified second voltage to the control electrode of said other discharge device to increase the level of conduction of one of said discharge devices, depending upon the phase of said received voltage, while maintaining the other discharge device substantially at its predetermined level of conduction.

13. A circuit responsive to the phase condition of a periodically varying input signal comprising means for deriving a first periodically varying signal substantially in phase with said input signal and a second periodically varying signal substantially 180° out of phase with said input signal, a first phase-discriminator device having an input for receiving a signal corresponding to said first signal, a second phase-discriminator device having an input for receiving a signal corresponding to said second signal, said devices being adapted for excitation from a source of periodically varying voltage having the same frequency as said input signal so that the tendency for one of said devices to conduct is increased relative to the other device depending upon the phase of said input signal, a first output circuit including a first electrical output load device, and a separate second output circuit including a separate second electrical output load device, said first discriminator device having an output coupled with said first circuit to supply a first periodically varying signal to said first load device for energizing said first load device, said second discriminator device having an output coupled with said second circuit to supply a second periodically varying signal to said second load device for energizing said second load device.

14. A circuit responsive to the phase condition of a periodically varying input signal comprising means for deriving a first periodically varying signal substantially in phase with said input signal and a second periodically varying signal substantially 180° out of phase with said input signal, a first phase-discriminator device having an input for receiving a signal corresponding to said first signal, a second phase-discriminator device having an input for receiving a signal corresponding to said second signal, said devices being adapted for excitation in phase from a source of A. C. voltage having the same frequency as said input signal so that the tendency for one of said devices to conduct is increased relative to the other device depending upon the phase of said input signal, a first output circuit including a first movable electrical output load device, and a separate second output circuit including a separate second movable electrical output load device, said first discriminator device having an output coupled with said first circuit to supply a first A. C. signal to said first load device for actuating said first load device, said second discriminator device having an output coupled with said second circuit to supply a second A. C. signal to said second load device for actuating said second load device.

References Cited in the file of this patent

UNITED STATES PATENTS

| | | |
|---|---|---|
| 1,921,983 | Wittkuhns | Aug. 8, 1933 |
| 2,338,732 | Nosker | Jan. 11, 1944 |
| 2,487,429 | Edwards | Nov. 8, 1949 |
| 2,531,492 | Angst et al. | Nov. 28, 1950 |
| 2,555,328 | Esval et al. | June 5, 1951 |